March 4, 1941.                H. T. McDONALD                 2,233,627
                              EQUALIZER APPARATUS
                            Filed May 13, 1939              2 Sheets-Sheet 1
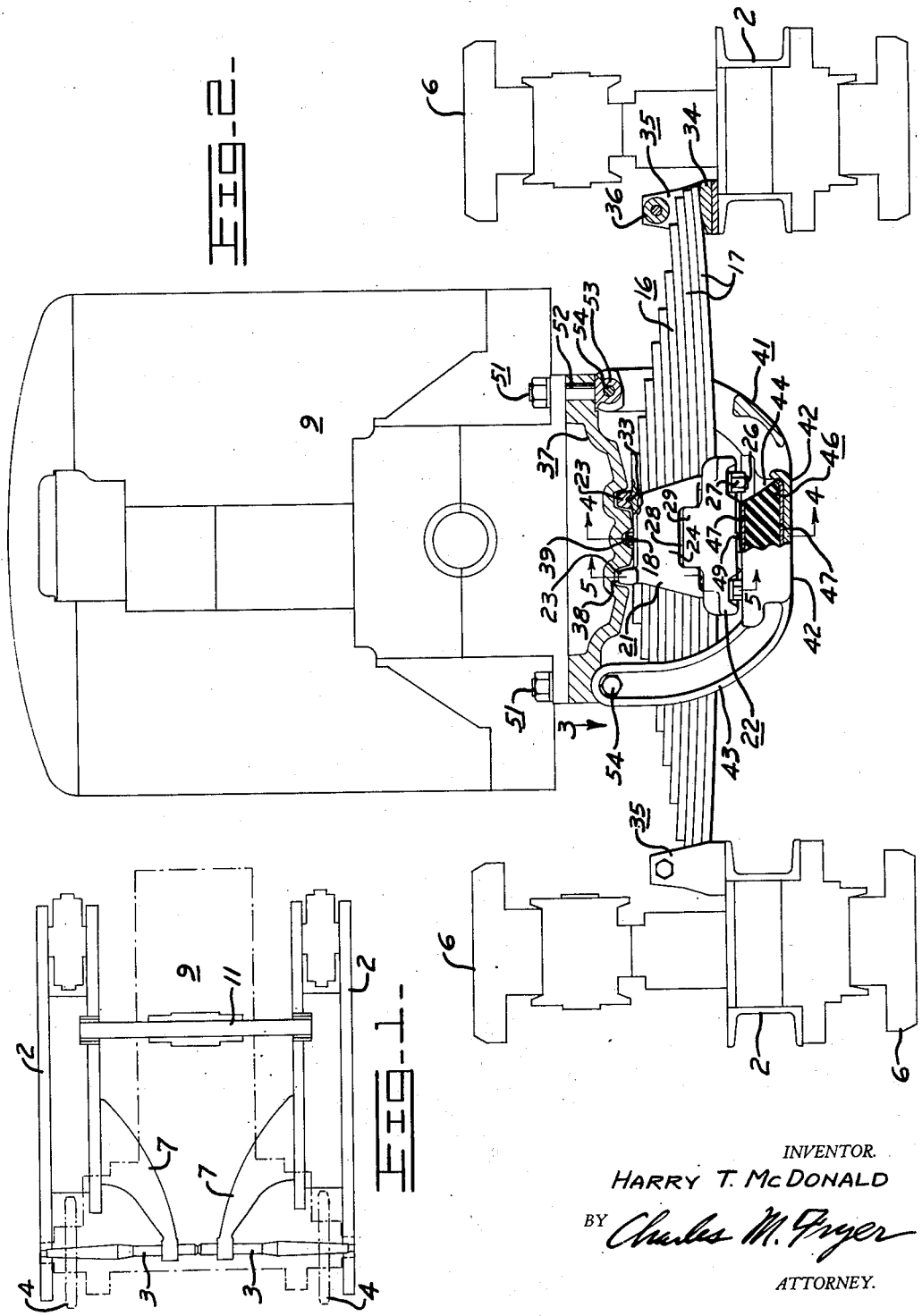
INVENTOR.
HARRY T. McDONALD
BY Charles M. Fryer
ATTORNEY.

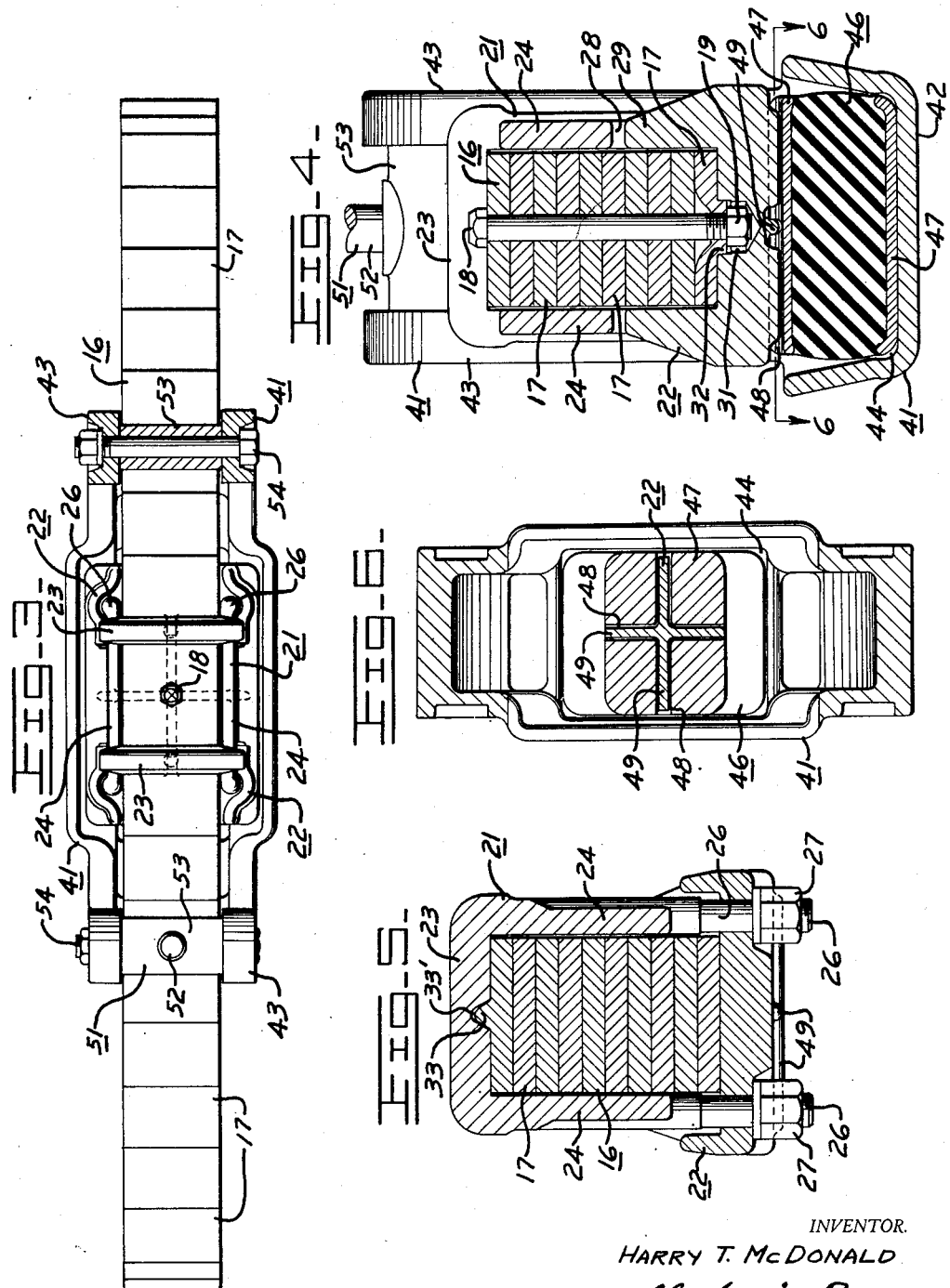

Patented Mar. 4, 1941

2,233,627

UNITED STATES PATENT OFFICE 2,233,627

EQUALIZER APPARATUS

Harry T. McDonald, Peoria, Ill., assignor to Caterpillar Tractor Co., San Leandro, Calif., a corporation of California Application May 13, 1939, Serial No. 273,493

9 Claims. (Cl. 305—9)

My invention relates to equalizer apparatus employed for supporting a track-type tractor body on endless track mechanisms, or which may support other vehicle bodies on similarly operable ground engaging means. More particularly, the equalizer apparatus of my invention is of the type illustrated in the patent to Best, No. 1,715,055, dated May 28, 1929.

Such apparatus includes main equalizer mechanism and auxiliary equalizer mechanism, and has the functions of permitting relative oscillatory or pivotal movements in vertical planes of the endless track or other similarly operable ground engaging mechanisms, but yet maintaining substantially equal weight distribution of the vehicle body upon such ground engaging mechanisms and also substantially even keel of the vehicle body during relative movements between the ground engaging mechanisms. The main equalizer mechanism permits the tractor body to be pivotally supported in surface contacting engagement therewith, and in such manner as to allow the tractor body to roll or rock from point to point. Side slipping of the tractor body with respect to the main equalizer mechanism is precluded by ridge or flange elements on the main equalizer mechanism which extend into or mesh with cooperating grooves formed in the body which is held in close engagement with the main equalizer mechanism and precluded from jumping the groove engaging ridges or flanges by means of the auxiliary equalizer mechanism. The auxiliary equalizer mechanism includes a leaf spring supported centrally thereof against the under surface of the main equalizer mechanism and connected at its ends to the tractor body by means of pivotally connected links or shackles. Such auxiliary spring is preloaded when assembled on the tractor so as to place the connecting links or shackles under tension, to thus cause the body of the tractor to be urged under positive action of the auxiliary spring against the main equalizer mechanism, to be maintained in close contact therewith. Although the main equalizer mechanism may constitute a rigid bar, a resilient member such as a leaf spring is more desirable.

An important advantage of such type of construction is that it permits ready dislocation of the tractor body from the main equalizer mechanism in the event of an accident, i. e., should the tractor roll down a steep hillside; thereby materially reducing the possibility of damage to the tractor. This is not the case with respect to equalizer apparatus in which a single member spanning the ground engaging means is fixedly pivotally connected to the tractor body, as damage might occur under similar circumstances, because the pivot connection being held or fixed, a portion of the body of the tractor might be torn out therefrom. Another advantage of the Best patent type of construction, is that the auxiliary spring functions in response to relative rolling or rocking movement of the tractor body on the main equalizer mechanism to oppose said movement, so as to tend to maintain the original normal relationship between the tractor body and the main equalizer mechanism, and this tends to promote stability and smooth operation.

The construction disclosed in the Best patent although employed successfully by my assignee for many years in all of the track-type tractors which it manufactures, tends to develop play in the connections between the auxiliary spring and the tractor body as wear occurs; and play may also develop in the auxiliary spring itself. As a result, the initial preload which is placed on the auxiliary spring may become reduced or lost, resulting sometimes in breakage of the main equalizer spring under severe shocks to which the equalizer apparatus may be subjected. This is so because when the preloading of the auxiliary spring decreases or is lost, the main equalizer spring will not be held so firmly in position, and may be consequently whipped about when the tractor is traveling over rough terrain.

My invention solves this problem, and has as its objects among others the provision of improved equalizer apparatus employing the principle disclosed in the Best patent in which: the auxiliary equalizer mechanism is of such character and connected in such way to the tractor body as to maintain its preloading for substantially the life of the entire equalizer apparatus itself; there are no moving parts between the auxiliary equalizer mechanism and the tractor body, which are subject to wear and which if wear did occur would destroy the constant preloading of the auxiliary equalizer mechanism; the construction is of such character as to allow greater free length of the main equalizer mechanism to thereby improve the resiliency thereof and consequent smooth operation of the tractor; and the construction is of such character as to enable a deeper section of the main equalizer mechanism without impairing ground clearance. Other objects of the invention will become apparent from a perusal of the following description thereof:

In general, the equalizer apparatus of my invention comprises employing instead of the auxiliary leaf spring disclosed in the Best patent and which is connected to the tractor body through pivotally mounted links or shackles, a mass or block of resilient material which is held against the under side of the main equalizer mechanism by means which is immovably connected to the tractor body. As a result of such construction, a substantially constant preloading of the resilient block or mass obtains, to thus overcome the previously described problem.

Reference is now made to the drawings for a more detailed description of the invention in which:

Fig. 1 is a schematic view of a track-type tractor having equalizer apparatus for supporting the front end of the tractor body or main frame upon the endless track mechanisms.

Fig. 2 is an elevational view illustrating my improved equalizer apparatus, and certain parts of a track-type tractor; a portion of the apparatus being broken away and shown in section to illustrate more clearly the construction.

Fig. 3 is a plan view looking in the direction of arrow 3 in Fig. 2, a portion of the structure being shown in section.

Fig. 4 is a vertical section taken in the plane indicated by line 4—4 in Fig. 2; a portion of the structure being broken away to illustrate the construction.

Fig. 5 is a vertical section taken in planes indicated by line 5—5 in Fig. 2.

Fig. 6 is a horizontal section taken in a plane indicated by line 6—6 in Fig. 4.

With reference to Fig. 1, which brings out the cooperative relationship of the equalizer apparatus to various portions of the tractor, the track-type tractor comprises a pair of spaced endless track mechanisms which include track frames 2 pivotally or hingedly secured at the rear of the tractor body to oscillate in vertical planes about the axis of the rear axles 3; final drive sprockets 4 being provided for engaging the customary endless tracks 6 (Fig. 2) to thereby effect propulsion of the tractor. The pivotal connections of the track frames 2 permit vertical oscillatory movements of the track mechanisms independently of each other to allow the tractor to accommodate itself to rough ground, and obstacles over which it may be traveling; such track mechanisms being maintained in parallel relationship with respect to each other and prevented from spreading by means of braces 7 pivotally connecting the track frames to the tractor main frame or body 9 which is supported adjacent its front portion on the equalizer apparatus 11 spanning the track frames and slidably supported thereon.

Such equalizer apparatus, as is illustrated in Figs. 2 through 6, comprises main equalizer spring 16 formed of a plurality of individual leaves 17 properly centered by means of bolt 18 passing through alined apertures in the individual leaves and which is secured by nut 19. Clamping means is provided for holding together the individual leaves comprising upper clamping member 21 and lower clamping member 22 securely held to the upper clamping member. Upper clamping member 21 is an integral or rigid structure which may be formed as a casting, and includes spaced cross pieces 23 secured to side plates 24. Studs 26 which are provided at the lower corners of the side plates 24, pass through apertures in lower clamping member 22 which is also an integral member and is held in position by nuts 27 screwed onto studs 26. As can be observed from Fig. 2, side plates 24 are provided with recesses 28 into which project ears 29 on lower clamping member 22 to thereby preclude relative endwise displacement between the two clamping members. With reference to Fig. 4, the bottom of lower clamping member 22 is formed with recess 31 to accommodate nut 19; and the lower leaf 17 of the main equalizer spring is formed with a boss 32 projecting into recess 31 to center the main spring 16 in the lower clamping member. Centering of the main spring in the upper clamping member is effected (Figs. 2 and 5) by projections 33 formed on the upper leaf of the main spring and which engage in recesses 33' formed in the under sides of cross pieces 23.

Each end of the main equalizer spring is slidably supported on a suitable pad 34 mounted in a bracket 35 fixed to each truck frame 2; a roller 36 being journalled in the bracket above pad 34 to preclude disengagement of the associated end of the main equalizer spring from the truck frame. The front portion of the tractor body 9 is supported on the main equalizer spring; and in the particular type of construction illustrated, the bottom crankcase pan 37, which is rigidly secured and therefore forms a part of the tractor body, rests upon the upper leaf of the main equalizer spring. The lower surface of body member 37 is arcuately shaped so as to contact the main equalizer spring on an arc to thus enable the body of the tractor to rock or roll freely over the main equalizer spring. To prevent lateral shifting of the body without impeding the rolling action, the cross pieces 23 of the clamping means for the main equalizer spring leaves, engage in grooves 38 formed in the under side of the body member 37; such under side being also formed with a recess 39 to accommodate the head of bolt 18 passing through the leaves of the spring.

From the preceding, it is seen that through the hinged or pivotal connections of the track frames 2 with the tractor body 9, the track frames can oscillate independently of each other to allow the tractor to traverse uneven ground. At the same time, the main equalizer 16 will support the front end of the tractor body; and such tractor body can roll or rock on the main equalizer spring as relative movement between the ground engaging track mechanisms occurs. The leaves of the main equalizer spring, being held together by integral clamping members 21 and 22, require no other clips or means spaced longitudinally along the main equalizer spring for holding the leaves together. Therefore, a free length of the main equalizer spring obtains beyond each end of the clamping means 21, 22, which serves to enhance the resiliency of the spring, thereby resulting in smoother action than would be the case with respect to spring leaves held together at points along the entire length of the spring.

Auxiliary equalizer mechanism is provided for holding the tractor main frame or body 9 in free pivotal contacting relationship with the main equalizer mechanism 16, irrespective of development of forces which might tend to cause the tractor body to jump the cross pieces 23; such auxiliary equalizer mechanism also serving the important function of stabilizing the body of the tractor during movement thereof. Such auxiliary equalizer mechanism comprises an integral supporting bracket 41 having bottom plate member 42 which is provided at each end thereof with spaced upwardly extending curved arms 43, between which is positioned the main equalizer spring 16. Bottom member 42 has a recess 44 in which is seated auxiliary equalizer spring 46 in the form of a resilient solid mass or block of material such as rubber, the upper and lower surfaces of which are adhesively secured, such as by vulcanization, to metal bearing plates 47 which serve to prevent wear and tear on the rubber and transmit uniformly the forces applied to block 46, such block being substantially immovable in recess 44. Upper plate 47, as can be seen more clearly from Figs. 4 and 6 is provided with crossed grooves 48 in which are engaged crossed ribs 49 formed on the under surface of lower clamping member 22, to thus preclude relative shifting movement in any direction between the main equalizer mechanism and the auxiliary equalizer mechanism, in the assembled construction.

The auxiliary equalizer mechanism is securely clamped or held with the rubber block 46 under compression against the under side of the main equalizer mechanism, by inverted T-bolts 51. The legs 52 of such T-bolts are secured to the body of the tractor, and the bars 53 thereof are provided with apertures through which pass bolts 54 which connect arms 43 to the T-bolts, and consequently to the body of the tractor. The rubber block 46 is of such thickness as to be placed under a predetermined compression when the entire equalizer mechanism is assembled, to thus cause the tractor body or main frame to be securely held against the equalizer apparatus for functioning in the manner already described. Such rubber block will not lose its resiliency even though it is initially preloaded because the constant working of the block which results during travel of the tractor, serves to impart life to the rubber and thereby prevent deterioration thereof.

In this connection, it is to be observed that since arms 43 are a rigid or integral part of the entire bracket structure 41, they are immovably or rigidly connected to the tractor body. As a result, no wear can occur, as might be the case with respect to pivotally mounted connecting links of the type disclosed in the Best patent, previously referred to; and consequently the preloaded compression placed upon auxiliary spring block 46 will remain substantially constant throughout the life of the equalizer apparatus, and such compression will only change during travel of the tractor. Because the preloaded compression will remain substantially constant, this precludes possible breakage of the main equalizer spring, which might otherwise occur should play develop in the connections of the auxiliary equalizer mechanism to the tractor body, which might cause the preload to be lost or lessened. Also, it is to be noted that spring block 46 bears against the main equalizer mechanism through upper plate 47 in contact with the bottom of lower clamping member 22. As a result, any reaction forces through block 46 are transmitted through the clamping means 21, 22 rather than through the leaves of the main spring 16, which serves to increase the life of the main spring.

Another important advantage which obtains by virtue of the auxiliary spring block in place of an auxiliary leaf spring, lies in the fact that such block does not have to be the depth of an auxiliary leaf spring necessary for providing an equivalent resiliency. As a result, ground clearance is increased for any given main spring depth. Also, more leaves may be employed in the main equalizer spring to provide a deeper section with consequent increase in strength, without impairment of ground clearance.

I, therefore, claim as my invention:

1. A vehicle comprising a body; spaced ground engaging means movably connected to said body; main equalizer mechanism providing a support for said body on said spaced ground engaging means; and auxiliary equalizer mechanism including a member having an upright portion connected to said body and another portion rigid with said upright portion below and substantially parallel to said main equalizer mechanism, and an independent mass of resilient material held between said another portion and said main equalizer mechanism.

2. A vehicle comprising a body; spaced ground engaging means movably connected to said body; main equalizer mechanism providing a support for said body on said spaced ground engaging means; and auxiliary equalizer mechanism including a bracket immovably connected to said body and having a portion thereof below said main equalizer mechanism, and a block of rubber clamped between said portion and said main equalizer mechanism.

3. A vehicle comprising a body; spaced ground engaging means movably connected to said body; main equalizer mechanism providing a support for said body on said spaced ground engaging means and upon which said body is mounted for rocking movement; and means for controlling such rocking movement and maintaining said body in engagement with said main equalizer mechanism including resilient means held against said main equalizer mechanism by means having an immovable connection with said body.

4. A vehicle comprising a body; spaced ground engaging means movably connected to said body; main equalizer mechanism providing a support for said body on said spaced ground engaging means and upon which said body is mounted for rocking movement; and means for controlling such rocking movement and maintaining said body in engagement with said main equalizer mechanism including resilient means clamped under predetermined preloading against said main equalizer mechanism by means immovably connected to said body and maintaining substantially constant said preloading.

5. A track-type tractor comprising a body; spaced endless track mechanisms hingedly connected to said body; main equalizer mechanism providing a support for said body on said endless track mechanisms and upon which said body is mounted for rocking movement; and auxiliary equalizer mechanism comprising a bracket having spaced upwardly extending portions immovably secured to said body and an intermediate portion below said main equalizer mechanism, and resilient means between said intermediate portion and said main equalizer mechanism.

6. A track-type tractor comprising a body; spaced endless track mechanisms hingedly connected to said body; main equalizer mechanism providing a support for said body on said endless track mechanisms and upon which said body is mounted for rocking movement; and auxiliary equalizer mechanism comprising a bracket having spaced upwardly extending portions immovably secured to said body and an intermediate portion below said main equalizer mechanism, and resilient means between said intermediate portion and said main equalizer mechanism; said resilient means comprising a block of resilient material to one face of which is secured a plate engaging said intermediate portion and to the opposite face of which is secured another plate engaging said main equalizer mechanism.

7. In equalizer apparatus of the type wherein a vehicle body is supported on spaced ground engaging means by main equalizer mechanism upon which said body rests for rocking movement, and said movement is adapted to be controlled by preloaded auxiliary equalizing means adapted to be held against said main equalizer mechanism and adapted to be connected to said tractor body; auxiliary equalizer mechanism constructed to maintain such preloading and preclude play in the connections to said tractor body to thereby preclude breakage of said main equalizer mechanism, comprising resilient means, and a member immovably connected to said body and clamping said resilient means against said main equalizer mechanism.

8. In equalizer apparatus of the type wherein a vehicle body is supported on spaced ground engaging means by main equalizer mechanism upon which said body rests for rocking movement, and said movement is adapted to be controlled by preloaded auxiliary equalizing means adapted to be held against said main equalizer mechanism and adapted to be connected to said tractor body; auxiliary equalizer mechanism constructed to maintain such preloading and preclude play in the connections to said tractor body to thereby preclude breakage of said main equalizer mechanism, comprising a block of rubber, and an integral bracket immovably secured to said body and clamping said block against said main equalizer mechanism.

9. A track-type tractor comprising a body; spaced endless track mechanisms hingedly connected to said body; main equalizer mechanism providing a support for said body on said endless track mechanisms and upon which said body is mounted for rocking movement; and auxiliary equalizer mechanism comprising an arched rigid bracket structure having upstanding portions immovably secured to said body and an intermediate portion below said main equalizer mechanism, and a block of resilient material clamped under compression between said intermediate portion and said main equalizer mechanism.

HARRY T. McDONALD.